(12) United States Patent  (10) Patent No.: US 9,104,247 B2
Maw  (45) Date of Patent: Aug. 11, 2015

(54) VIRTUAL KEYPAD INPUT DEVICE

(76) Inventor: Wai-Lin Maw, Boise, ID (US)

( * ) Notice: Subject to any disclaimer, the term of this patent is extended or adjusted under 35 U.S.C. 154(b) by 1314 days.

(21) Appl. No.: 12/714,519

(22) Filed: Feb. 28, 2010

(65) Prior Publication Data

US 2010/0156837 A1   Jun. 24, 2010

Related U.S. Application Data

(62) Division of application No. 11/194,788, filed on Aug. 1, 2005.

(51) Int. Cl.
| | |
|---|---|
| H03K 17/94 | (2006.01) |
| H03M 11/00 | (2006.01) |
| G06F 3/02 | (2006.01) |
| G06F 3/023 | (2006.01) |
| G06F 3/0488 | (2013.01) |
| H04M 1/23 | (2006.01) |

(52) U.S. Cl.
CPC ............ *G06F 3/0219* (2013.01); *G06F 3/0233* (2013.01); *G06F 3/0238* (2013.01); *G06F 3/04886* (2013.01); *H04M 1/23* (2013.01); *H04M 2250/22* (2013.01)

(58) Field of Classification Search
USPC ........................................................... 341/34
See application file for complete search history.

(56) References Cited

U.S. PATENT DOCUMENTS

| | | | |
|---|---|---|---|
| 2002/0027549 A1* | 3/2002 | Hirshberg | 345/168 |
| 2004/0155870 A1* | 8/2004 | Middleton | 345/173 |
| 2006/0033723 A1* | 2/2006 | Maw | 345/173 |

* cited by examiner

*Primary Examiner* — Travis Hunnings

(57) ABSTRACT

A compact input device for fast text input. Ten perimeter regions are defined in a decagon shaped ring on a touch pad, and nine more center regions arranged in a 3 by 3 matrix are defined at the center of the perimeter regions. In alphanumeric mode, each of the ten perimeter regions represents a numeral or a character of the same order, found on a corresponding key of the ten numeric keys, 0 to 9, found on a standard 12-key telephone keypad. All perimeter regions synchronously switch to another group of characters of the same order, in accordance with the direction of a swipe on any of the perimeter regions. A tap on a perimeter region selects the character represented by the region at the moment. In addition, it is capable of operating in a standard 12-key telephone keypad mode, pointing device mode, and symbol mode.

20 Claims, 17 Drawing Sheets

VIRTUAL KEYPAD INPUT DEVICE

CROSS REFERENCE TO RELATED APPLICATIONS

Figure 1:
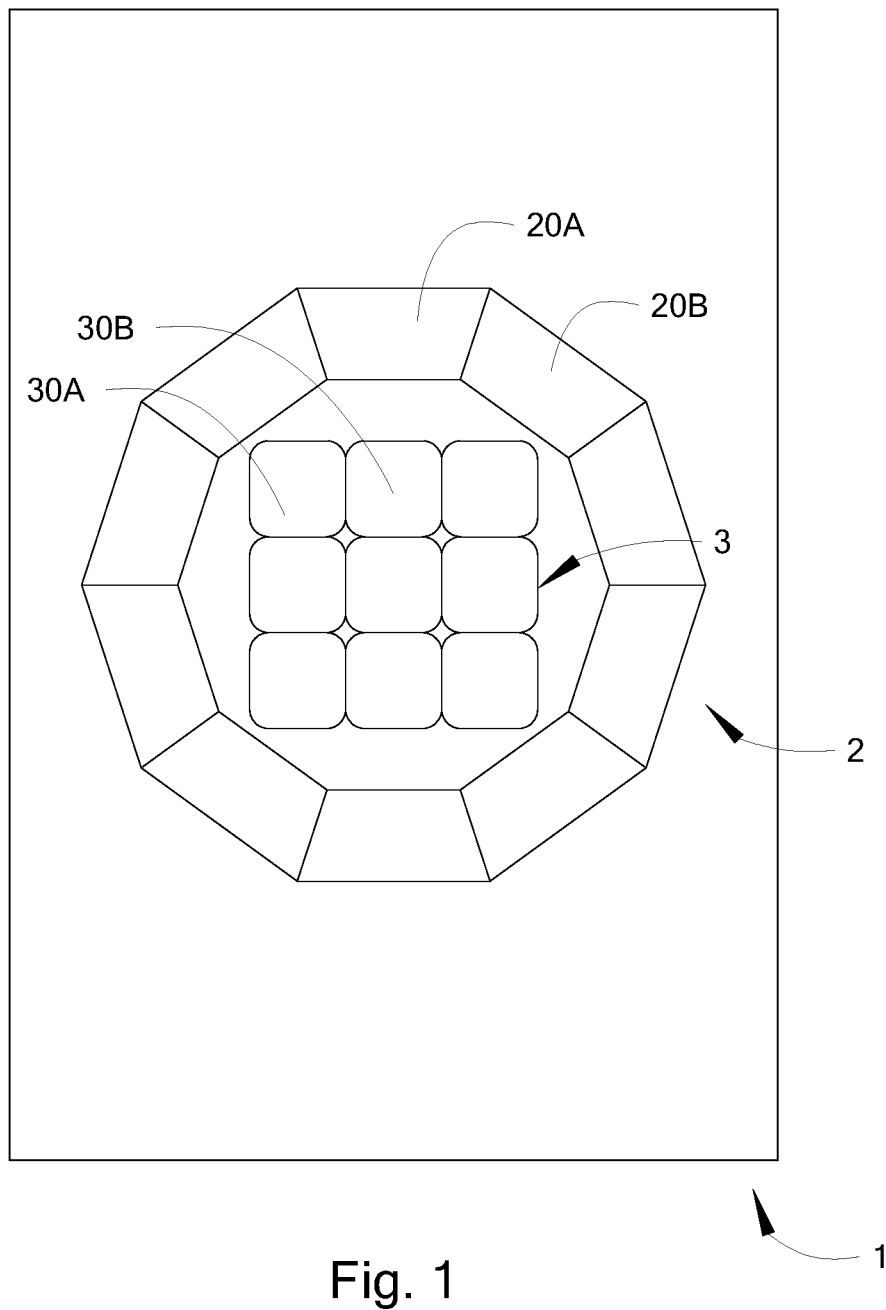

This application is a divisional of application U.S. Ser. No. 11/194,788, filed on Aug. 1, 2005.

BACKGROUND

1. Field of Invention

The invention will provide a space efficient alphanumeric input device that can be used in applications where there is a limited amount of space available for an input device such as desktop telephones, cell phones, personal digital assistances, sprinkler system controls, and medical equipment.

2. Discussion of Prior Art

Since the time telephone numbers have become of standard use, telephone dials had been made with numerals. With the increasingly important role played by the telephone in commerce, groups of alphabets have been assigned to the numeric keys to offer a more convenient way of memorizing a business telephone number, such as in 1-800-FLOWERS.

With the convergence of voice and data, another trend that became popular in recent years was text messaging and data storage, most commonly on mobile phones. The emergence of telephones incorporating a graphical user interface (GUI) has also called for a need for GUI input devices.

While the demand for additional functionality has increased, the ideal space available for an input device on a telephone unit has remained relatively unchanged. Uncompromising as it is, the limitation is a result of the inherent requirement for a practical size that can be handled with ease, especially on mobile phones.

Various inventions have been brought about in an attempt to improve the input capability of telephones and electronic devices alike where space limitation is a barrier.

Some inventions have employed an extra alphanumeric keyboard with a layout similar to the "QWERTY" typewriter keyboards, some side by side with the standard 12-key telephone keypad, while others provide an external unit, which can be hooked up to the telephone. The major drawback of this approach is its bulkiness.

Another invention brought forward is a cluster key arrangement where the members of a group of characters designated to a given primary numeric button are assigned to the secondary buttons, which are smaller buttons attached to the edge of the primary numeric button. This approach clearly suffers from the miniaturized secondary buttons.

Yet, another approach, which is mostly found on some desktop phones and personal digital assistances, is a miniature keyboard with a layout similar to the full sized keyboard found on personal computers. This approach also suffers from the miniaturization of the keys, since they can only be so small, before it becomes impractical to use.

The most common method of adding character input capability to a standard 12-key telephone keypad is to assign three additional characters to the numeric keys such as "A," "B," and "C" on the number "2" key. The disadvantage of this approach is the need to repeatedly press the key to input characters. For example, the number "2" key has to be pressed two times to enter character "B" and three times to enter "C." If it was pressed three times by mistake to enter character "B," the character has to be deleted and the whole sequence has to be repeated again. Not only that, if two consecutive characters are assigned on the same key, the user has to wait until the system recognizes the current character as the desired character for input, before using the same key to enter the next character.

Two of the most challenging aspects of designing an alphanumeric keypad for a telephone, especially a mobile unit, are efficient use of the limited space, and convenience. The inventions that have been brought forward so far are designed around concepts that suffer from one or more factors of being bulky, miniaturized, or inconvenient.

OBJECTS AND ADVANTAGES

One object of the present invention is to provide a faster and more intuitive input device for entering text in applications where space is limited for an input device.

Another object is to provide an input device, which is compact and space efficient, yet free of miniaturization.

Yet, another object is to provide an input device that is capable of functioning in character input mode as well as in graphical input modes.

The present invention allows to be programmed to offer the full character set including special characters that a full size keyboard offers, and requires fewer actions to enter a character. It quadruples as an alphanumeric input device, a standard 12-key telephone keypad, a regular touch-pad, and a symbol input device. Moreover, it only requires the amount of space of a standard 12-key telephone keypad, with no miniaturized components.

SUMMARY

The major challenges in designing an input device for a telephone are to be space efficient yet free of miniaturization, and convenient and intuitive to use. The challenges are especially true for today's work environment where the computer display, keyboard, mouse and papers etc. compete with the telephone for one's desk space. The challenges are even more acute for a mobile phone unit, where the trend is for lighter and more compact designs.

Several concepts have been brought forward in an attempt to address these challenges, but they all have one or more inherent limitations of bulkiness, inconvenience, or miniaturization.

The present invention relates to a concept that offers a compact design that is convenient to use, and at the same time free of miniaturization.

A number of regions defined by a set of spatial boundaries on a motion sensitive medium represent different attributes at different times. The space and time of a target in relation to the spatial boundaries, such as entering, leaving or traversing the regions, are monitored and recorded in real time. Depending on the selected mode, a traversing motion is interpreted as a signal to change the current attributes represented by the regions, to draw a segment of a symbol, or to move a pointer on a display. Similarly, detecting the presence and absence of the target object recorded in a region is interpreted as selecting an attribute represented by that region, or selecting a target pointed on a display by a pointer.

The regions can represent linguistic, artistic, scientific, mathematical, spiritual, or a custom symbols. They can also be configured to represent attributes resulting in utilitarian constructs. The regions are further grouped into a number of subsets, where a subset is a set containing zero, some or all elements of its superset, where they serve different functions in different modes. Dual-tone-multi-frequency (DTMF) and pulse dialing subsystems are also incorporated into the system to allow the device to serve as a dialing apparatus. A heads-up display, information projected into the user's visual field or line of sight, is incorporated as a visual aid to the operation of the device.

DRAWINGS

Figures

Figure 2:
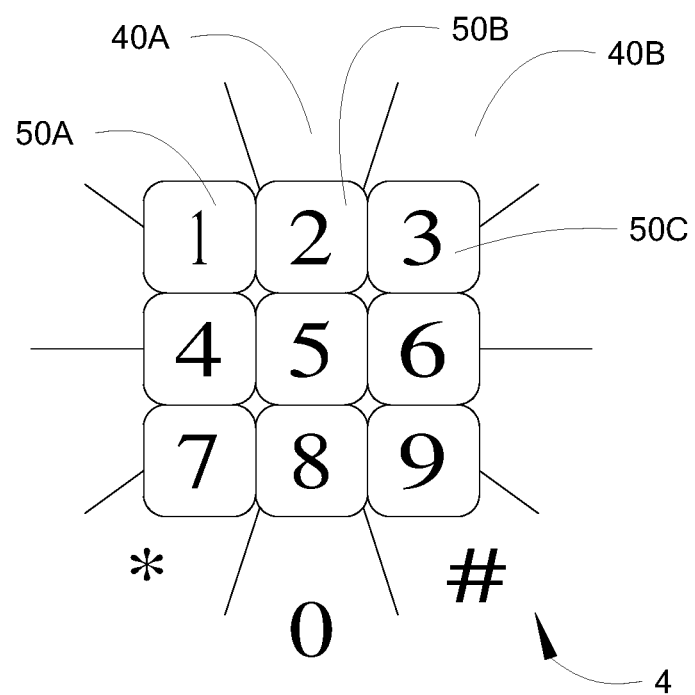
Figure 3:
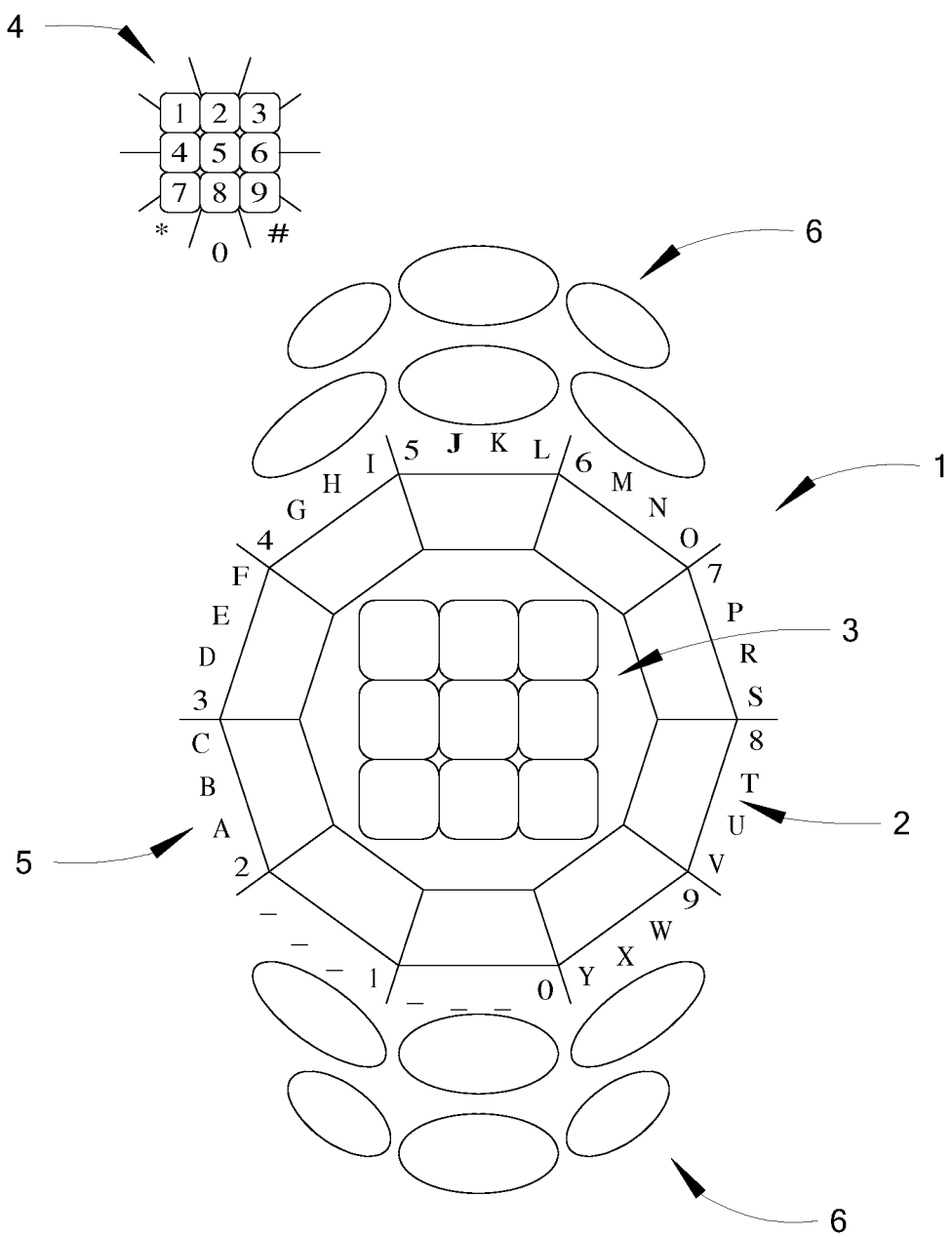
Figure 4:
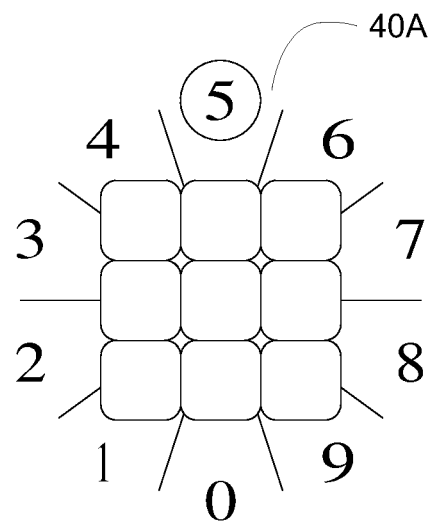
Figure 5:
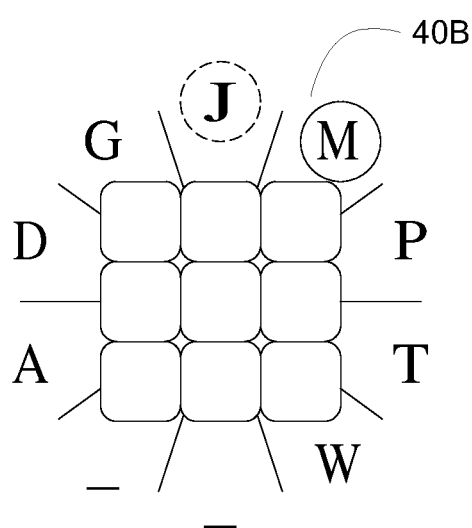
Figure 6:
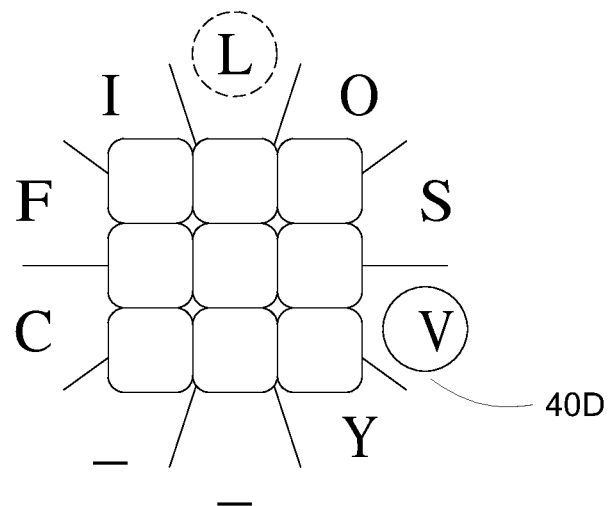
Figure 7:
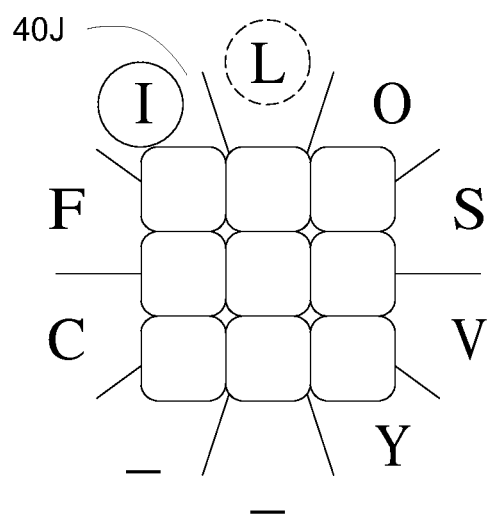
Figure 8:
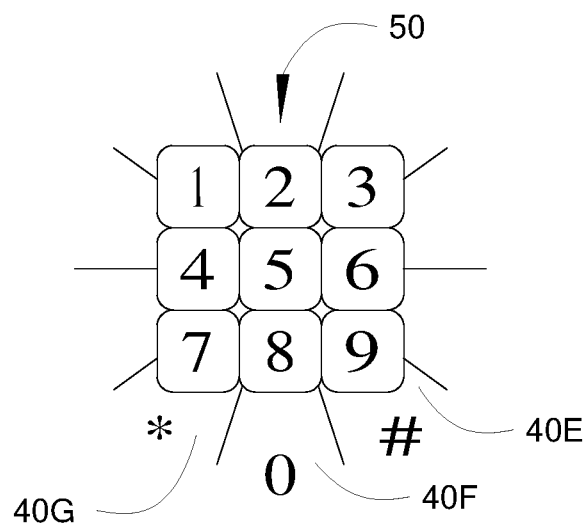
Figure 9:
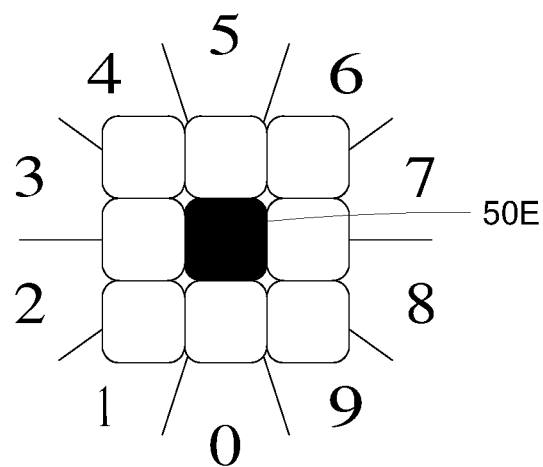
Figure 10:
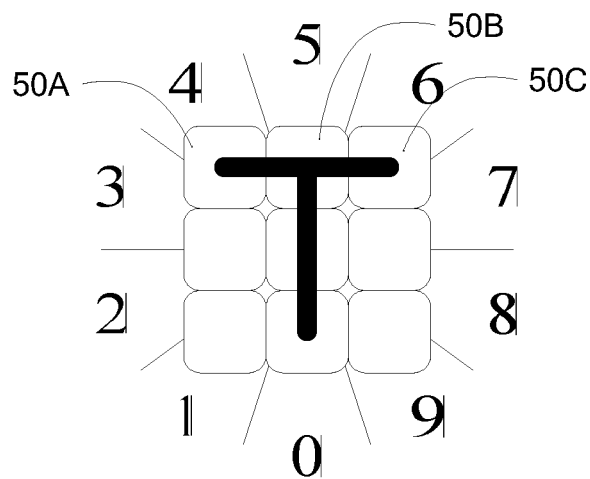
Figure 11:
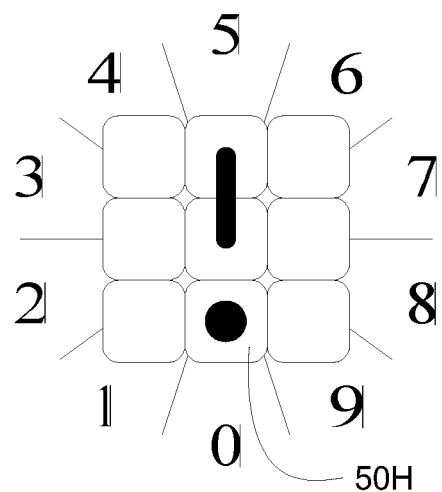
Figure 12:
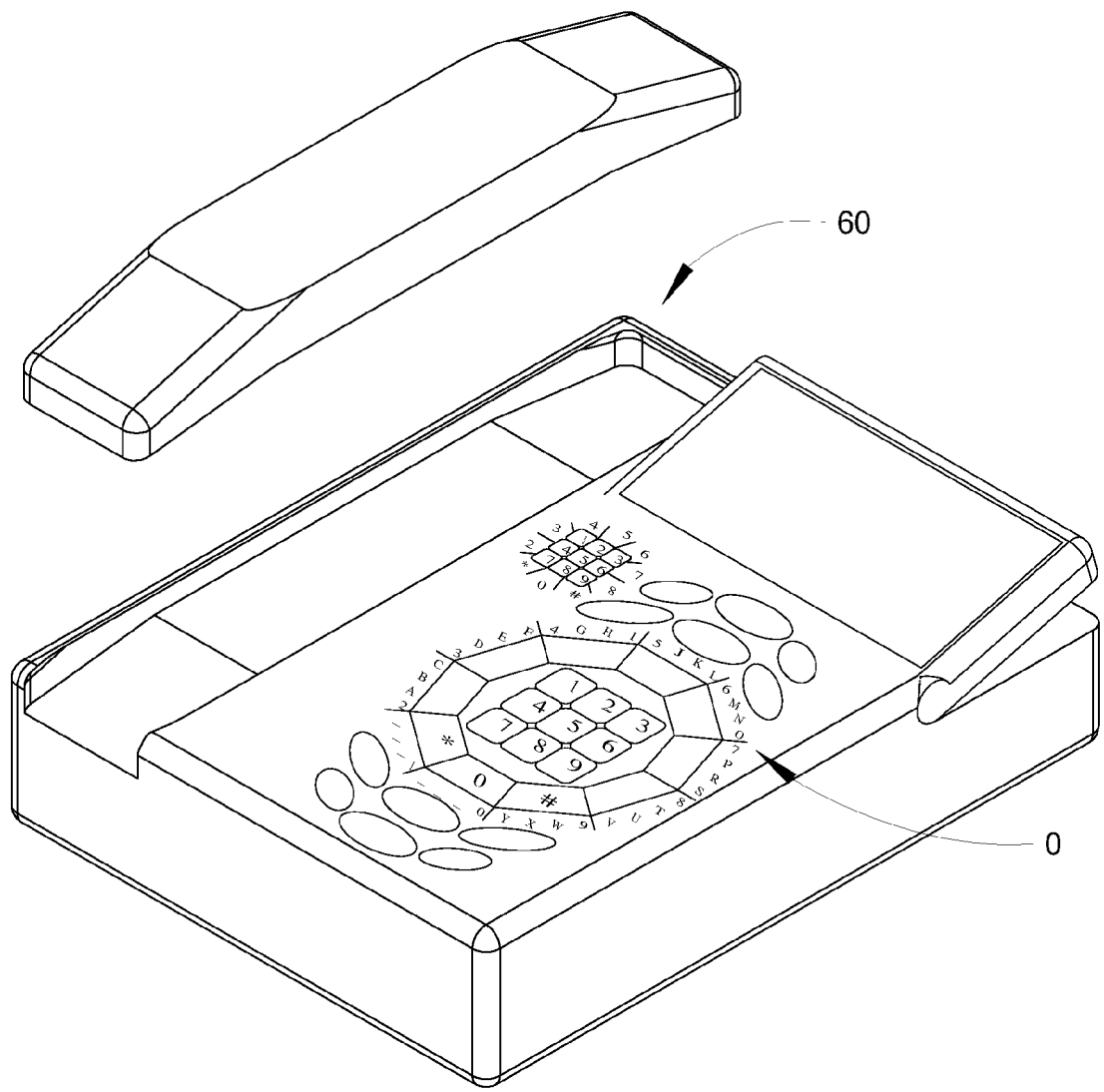
Figure 13:
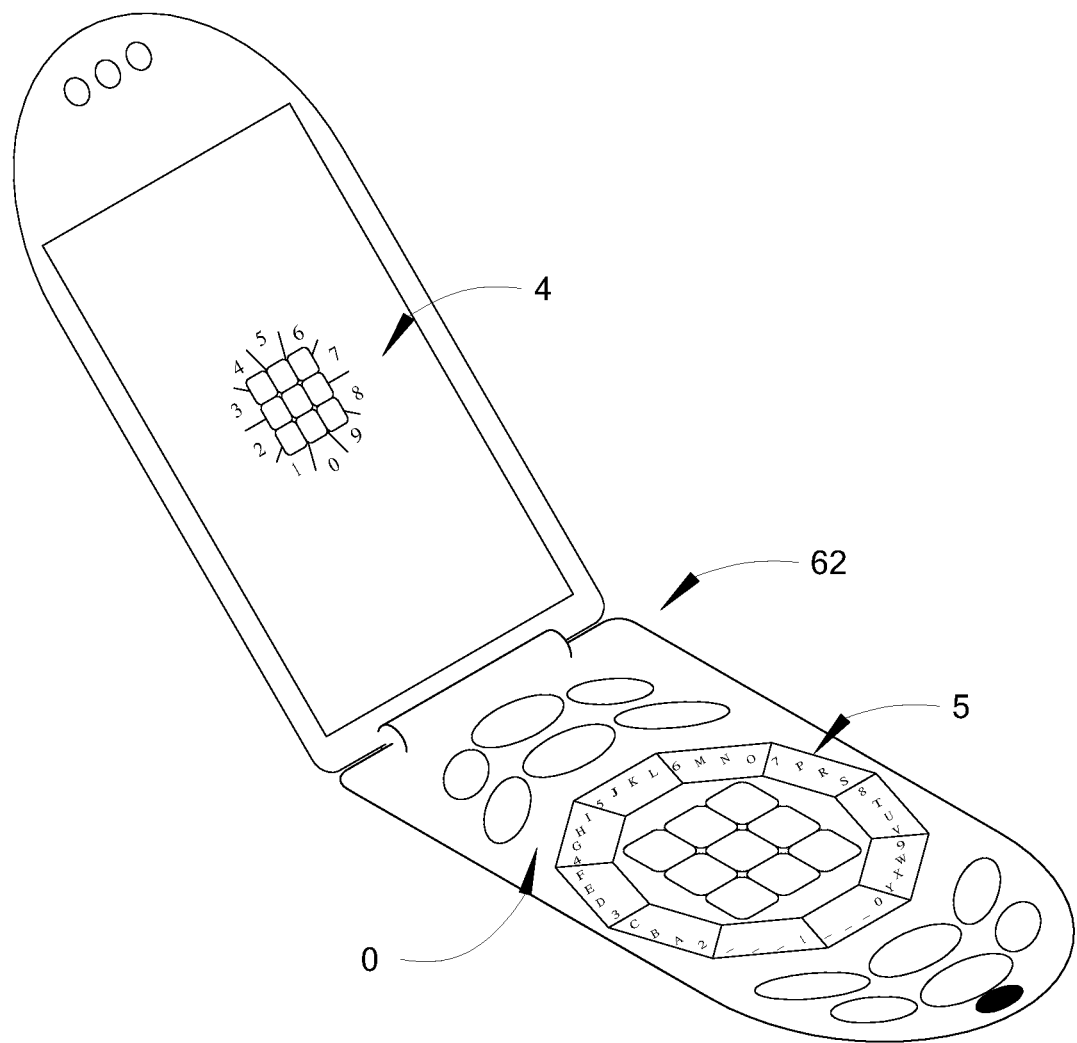
Figure 14:
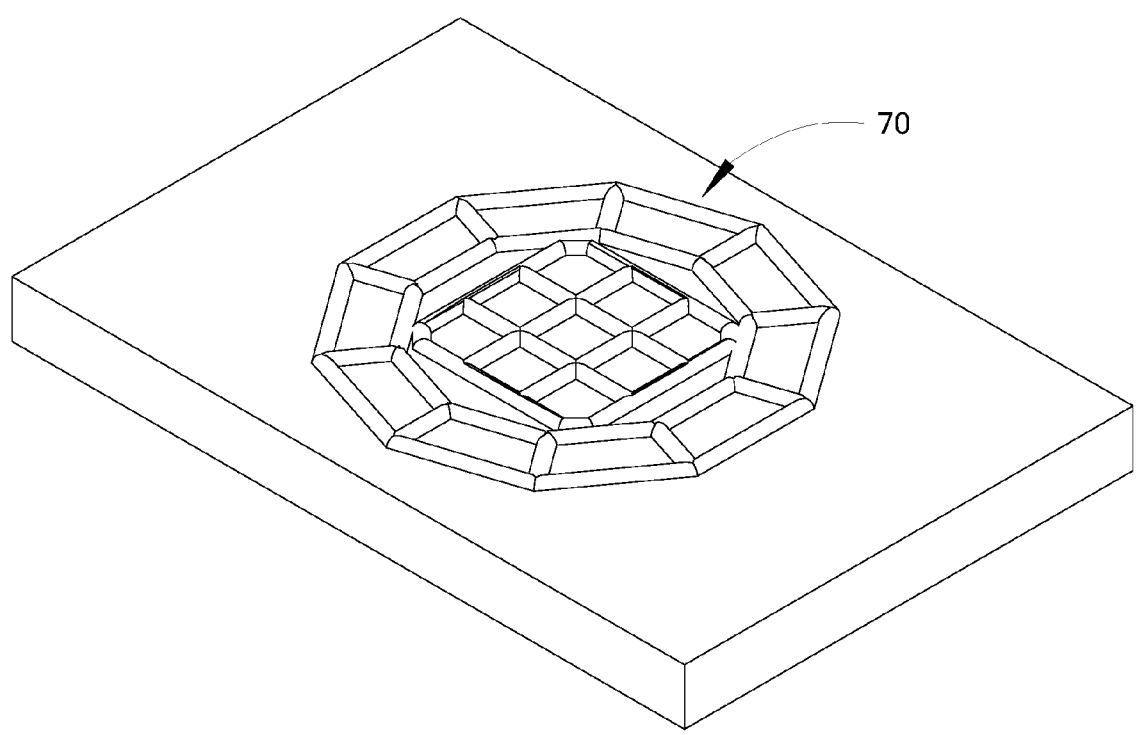
Figure 15:
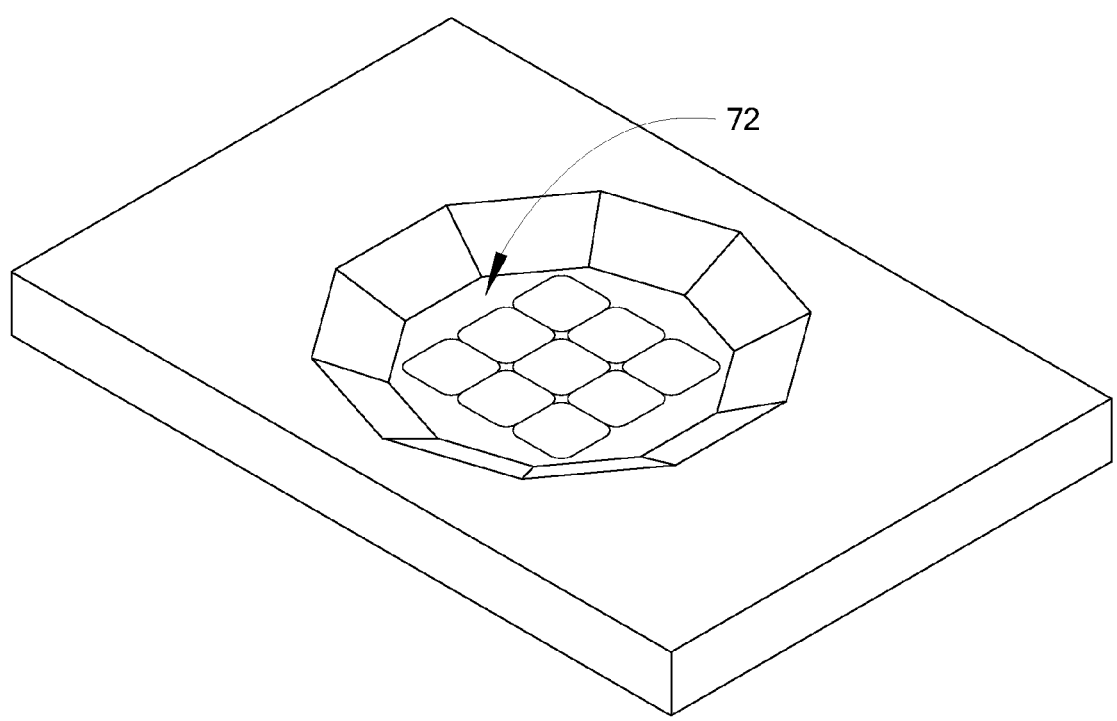
Figure 16:
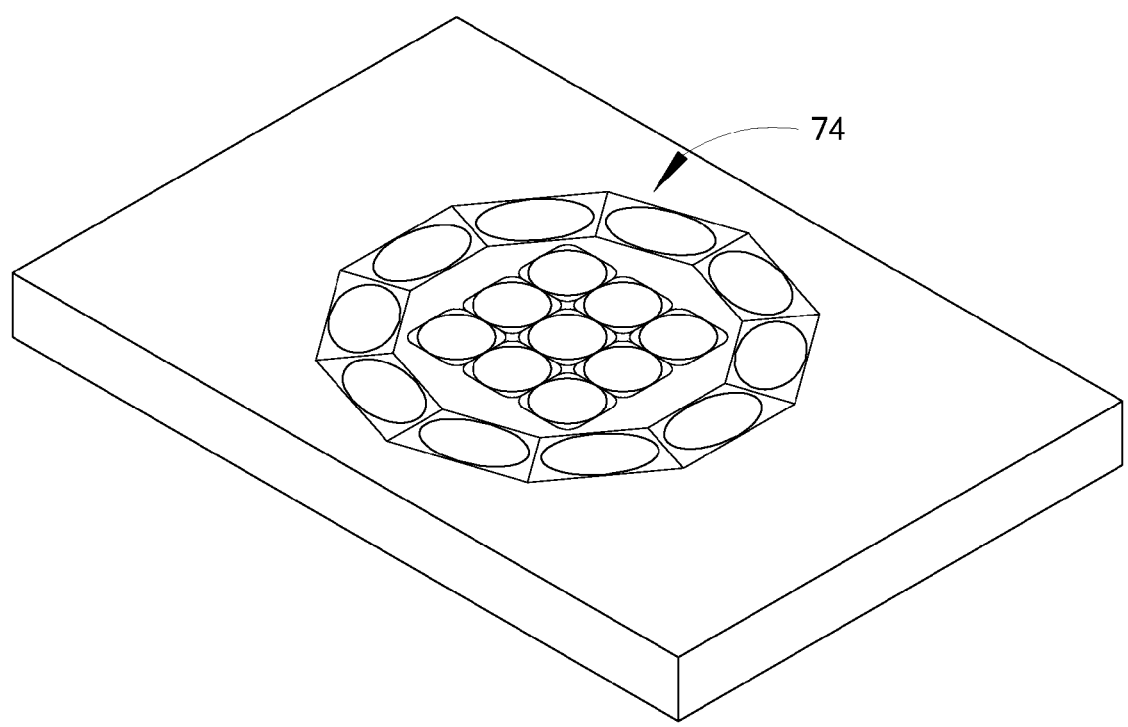
Figure 17:
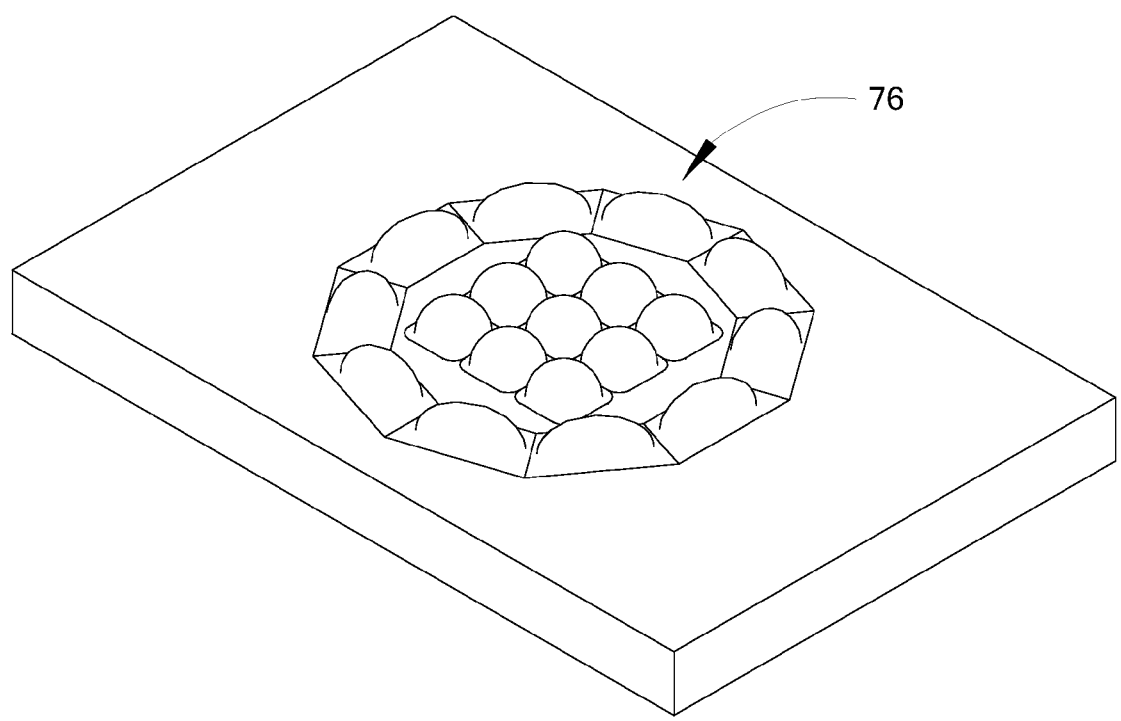
Figure 18:
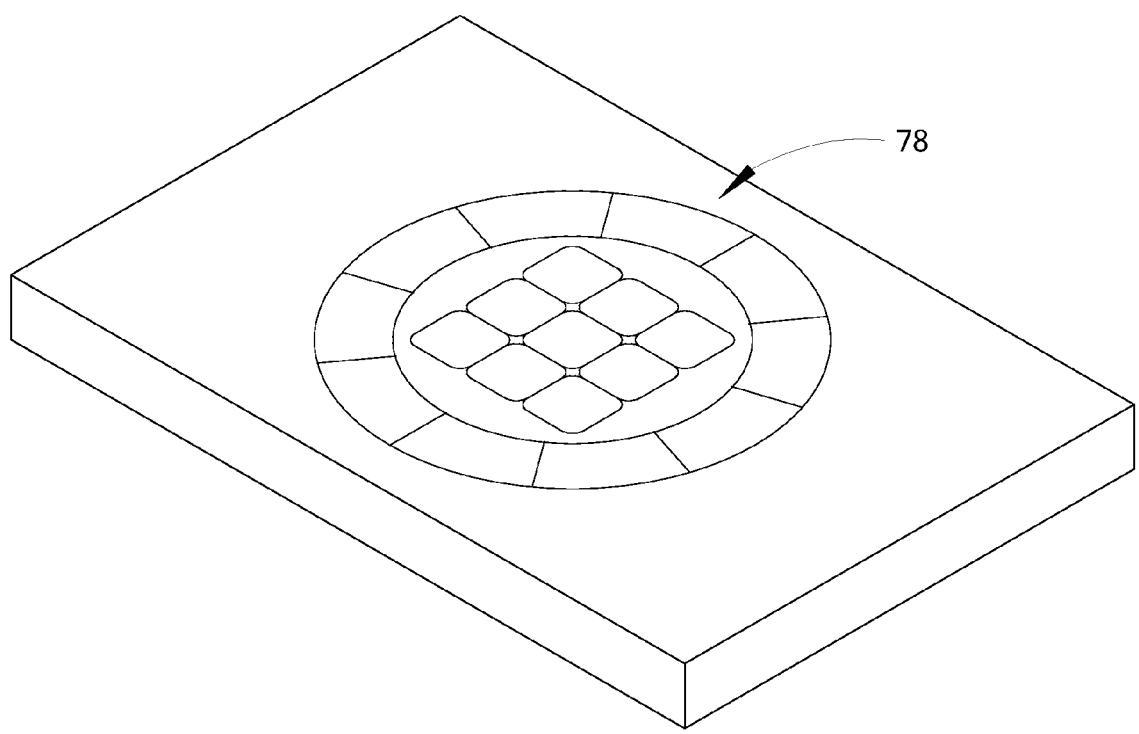
Figure 19:
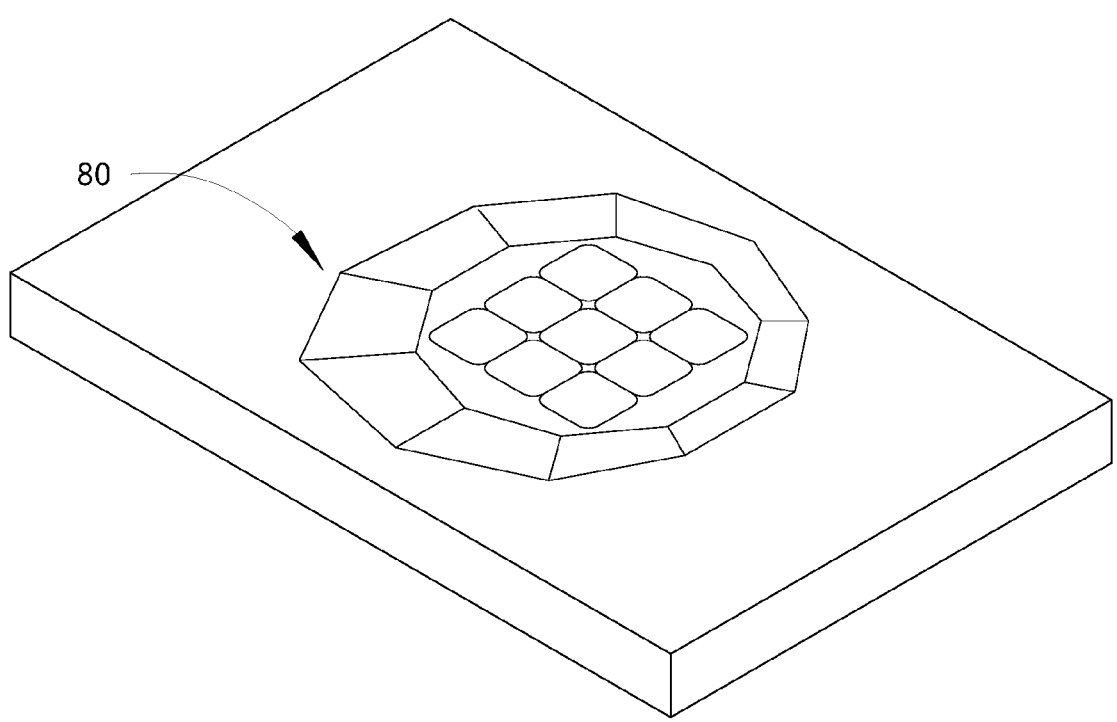
Figure 20:
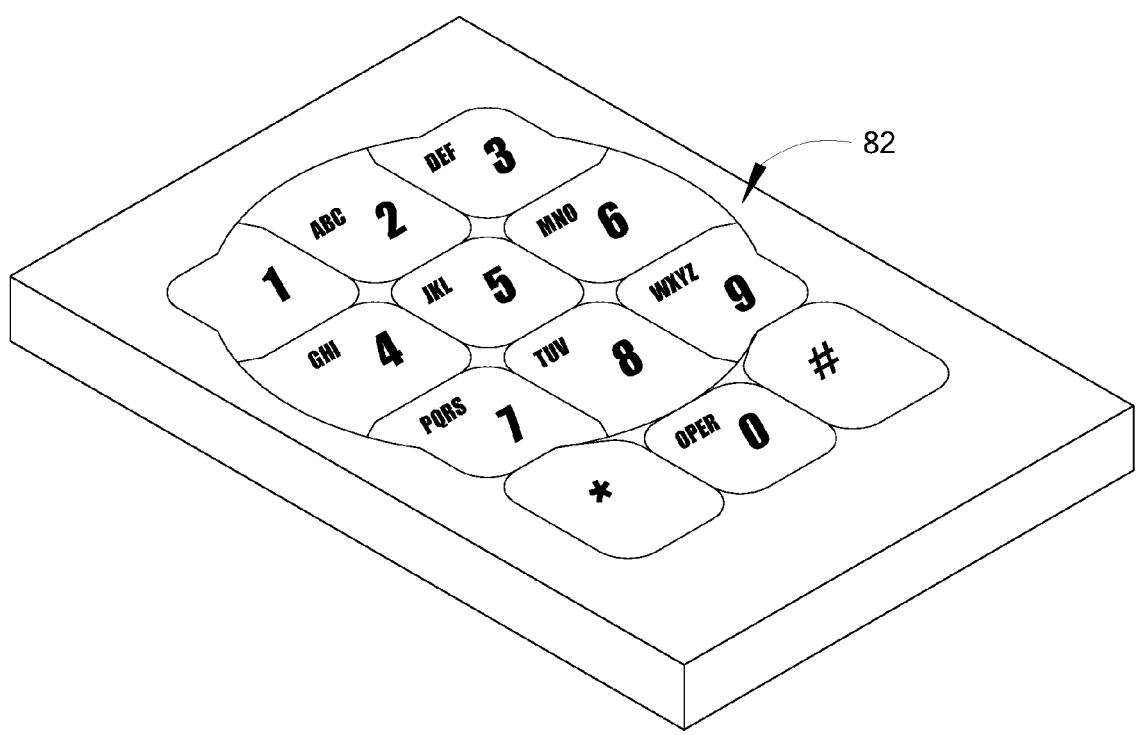
Figure 21:
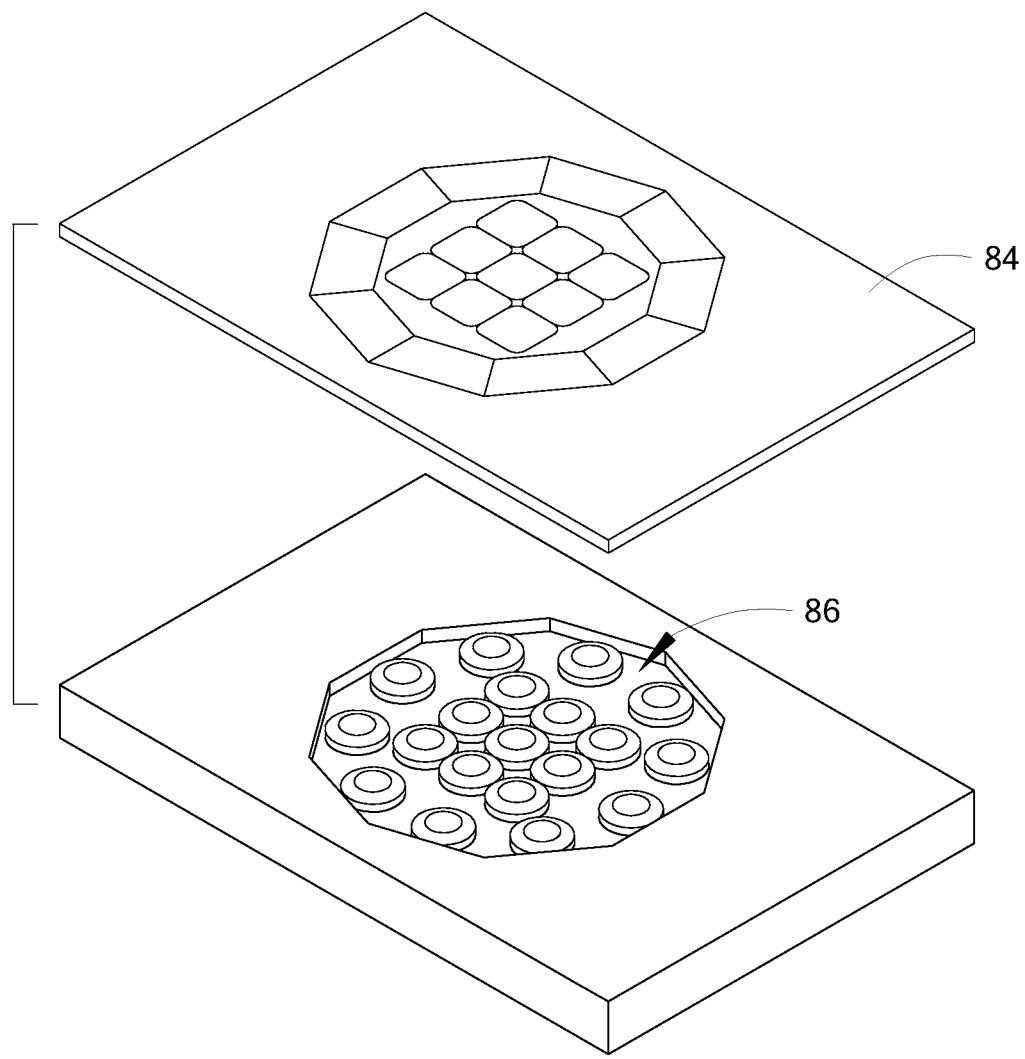

FIG. 1—is the pressure sensitive touch pad, and layout of the center and perimeter regions
FIG. 2—is the heads-up display
FIG. 3—is the standard setup
FIG. 4—is the heads-up display in alphanumeric mode showing the contact point on the perimeter region for numeral 5
FIG. 5—is the heads-up display showing the state after the user makes a clockwise swipe one region
FIG. 6—is the heads-up display showing the state after the user makes a clockwise swipe three regions
FIG. 7—is the heads-up display showing the state after the user makes a counterclockwise swipe one region
FIG. 8—is the heads-up display in standard 12-key telephone keypad mode
FIG. 9—is the heads-up display in pointing device mode
FIG. 10—is the heads-up display in symbol mode with straight lines only
FIG. 11—is the heads-up display in symbol mode with a straight line and a dot
FIG. 12—is the virtual keypad system applied on a desktop telephone unit
FIG. 13—is the virtual keypad system applied on a mobile telephone unit
FIG. 14—is an alternative embodiment with ridges around the regions
FIG. 15—is another alternative embodiment with recessed center regions and downward sloping perimeter regions
FIG. 16—is another alternative embodiment with dimpled regions
FIG. 17—is another alternative embodiment with raised regions
FIG. 18—is another alternative embodiment with a circular perimeter region
FIG. 19—is another alternative embodiment with an asymmetric perimeter region
FIG. 20—is another alternative embodiment with common regions
FIG. 21—is another alternative embodiment with a flexible touch pad surface overlaid on top of push buttons

LIST OF REFERENCE NUMERALS

0—Virtual keypad
1—Pressure sensitive touch pad
2—Perimeter regions
3—Center regions
4—Heads-up display
5—Character set label
6—Auxiliary push button keys
20A, B—Virtual keypad perimeter region
30A, B—Virtual keypad center region
40A, B, D, E, F, G, J—Heads-up display perimeter region
50—Heads-up display center regions
50A, B, C, E, H—Heads-up display center region
60—Desktop telephone unit
62—Mobile telephone unit
70—Ridges around regions
72—Recessed center regions and downward sloping perimeter regions
74—Dimpled regions
76—Raised regions
78—Circular perimeter region
80—Asymmetric perimeter regions
82—Common regions
84—Flexible pressure sensitive touch pad
86—Push buttons

DETAILED DESCRIPTION

Preferred Embodiment

The present invention is illustrated with an implementation utilizing a touch pad as the medium. The touch pad, a pressure sensitive surface that can sense a contact point, which is the point impressed upon its surface by the user's motion, transmits the coordinates of the contact point to an operating system. The operating system is a collection of various software and hardware subsystems tailored for a specific apparatus where the input device is to be applied.

FIG. 1 shows the layout of the perimeter regions 2, and center regions 3 on a standard touch pad.

The input device can be in four different modes: alphanumeric mode, standard 12-key telephone keypad mode, pointing device mode, and symbol mode. The system interprets the movement of the contact point within and across the regions to determine the appropriate signal for the selected mode. DTMF and pulse dialing subsystems can also be incorporated for applications on telephones.

FIG. 2 shows a heads-up display 4, when mounted in an appropriate position, serves as a visual aid to the user by displaying the state of the virtual keypad.

FIG. 3 shows a standard setup of the system which includes a collection of perimeter regions 2, a collection of center regions 3, a label 5 displaying the characters each region in the perimeter regions 2 can be assigned to, a heads-up display 4, and a collection of auxiliary keys 6 positioned above and below the touch pad.

The touch pad 1 is connected to an appropriate interface (not shown) where communication with an appropriate software driver (not shown) occurs, which in turn communicates with the operating system (not shown).

Similarly, heads-up display 4 is connected to an appropriate interface (not shown) to receive instructions from the operating system to display the state of the touch pad 1.

The auxiliary push button keys can be programmed for standard input functions such as mouse left, mouse right, mode, escape, delete, insert, shift, enter, and cursor navigation.

The character set used in this set up is made up of the following character groups similar to the arrangement found on a standard 12-key telephone keypad, with an "_" character indicating unavailability, a null value or an alternative character:

Group 1 [1, 2, 3, 4, 5, 6, 7, 8, 9, 0]
Group 2 [_, A, D, G, J, M, P, T, W, _]
Group 3 [_, B, E, H, K, N, R, U, X, _]
Group 4 [_, C, F, I, L, O, S, V, Y, _]

When in alphanumeric mode, each of the perimeter regions represents no more than one character from the currently selected character group. When a signal to increment the character group that the perimeter regions are representing is received, each of the perimeter regions is assigned a character from the succeeding character group specified. Similarly, when a signal to decrement the character group that the perimeter regions are representing is received, each of the perimeter regions is assigned a character from the preceding character group specified. When the first or the last group is reached, the system can be programmed to wrap around to the last or first character groups respectively. Alternative schemes can also be arranged to customize the character assigned to a region according to the current state of the system.

An alternative character set which contain the characters "Q" and "Z" can be arranged as follows:
Group 1[1, 2, 3, 4, 5, 6, 7, 8, 9, 0]
Group 2 [_, A, D, G, J, M, P, T, W, _]
Group 3 [_, B, E, H, K, N, Q, U, X, _]
Group 4 [_, C, F, I, L, O, R, V, Y, _]
Group 5 [_, _, _, _, _, _, S, _, Z, _]

OPERATION OF THE INVENTION

Preferred Embodiment

The actions by the user on the touch pad are fed into the driver, a subsystem of the operating system, and an algorithm translates them and generates an appropriate signal.

Communication between the touch pad and the driver takes place for each of the following events:
The user touching down on the touch pad;
The user lifting off from the touch pad, and
The user moving across the touch-pad surface.

The driver organizes the information received from the touch pad and transmits it to the operating system as follows:
If the movement is in the center regions:
  A flag indicating that the center regions have received focus;
  A flag indicating that the center regions have lost focus;
  The previous contact region;
  The current contact region;
  A single tap as a single click or a single select;
  Two successive taps as a double click or a double select;
  Two successive taps and holding down after the second tap as a click and hold;
  A touch down followed by movement as moving the pointer;
  A click and hold followed by movement as a hold and drag; and
  A lift off as a mouse button release.
If the movement is in the perimeter regions:
  A flag indicating that the perimeter regions have received focus;
  A flag indicating that the perimeter regions have lost focus;
  The previous contact region;
  The current contact region;
  The direction of movement—clockwise or counter clockwise; and
  A single tap as a single click.

The operating system can be in one of the following four modes when interpreting the information from the driver:
Alphanumeric mode;
Standard 12-key telephone keypad mode;
Pointing device mode; and
Symbol mode.

The operating system interprets the information received from the driver and acts depending on the current mode. The contact point traversing across the touch pad with a substantially sliding motion is interpreted as a swiping or a tracing motion. The contact point touching down and lifting off within a certain time interval is interpreted as a single tap, and two successive taps within a certain time interval is interpreted as a double tap. A double tap without a lift off after the second touch down motion followed by a lateral movement of the contact point is interpreted as a drag and hold action.

FIG. 4 shows the heads-up display in alphanumeric mode, where the first group of characters is assigned to the 10 perimeter regions. A circle is displayed on region 40A where the current contact point is positioned. Character group 1 is assigned to the perimeter regions at this stage. Tapping on a perimeter region sends the character that it is currently assigned to the region to the operating system. Circular sliding movements, clockwise or counterclockwise, on the perimeter regions respectively increment or decrement the character group assignment to the perimeter regions. The number of character groups changed equals the number of adjacent perimeter regions that the contact point moves into in the process of traversing the perimeter regions. The character group assignment is also arranged to wrap around.

FIG. 5 shows the state after the user makes a clockwise swipe one region. The circle indicates that the contact point is now positioned on perimeter region 40B. Character group 2 is assigned to the perimeter regions at this stage.

FIG. 6 shows the state after the use makes a clockwise swipe three regions. The circle indicates that the contact point is now positioned on perimeter region 40D. Character group 4 is assigned to the perimeter regions at this stage.

FIG. 7 shows the state after the user makes a counterclockwise swipe one region from the state shown in FIG. 4. The circle is now positioned on perimeter region 40J. Character group 4 is assigned to the perimeter regions at this stage. The character groups wrapped around backward to the last character group in this case, since the previously selected character group was the first of the four character groups. The resulting character assignment is the same as making a clockwise swipe spanning three consecutive regions, as shown in FIG. 6.

FIG. 8 shows the heads-up display in the standard 12-key telephone keypad mode, where the nine center regions 50, and the three perimeter regions 40E, 40F and 40G represent the alphanumeric keys found on a standard 12-key telephone keypad. The numeric digit or the character displayed on the region that the user taps is fed into the operating system for further processing as required. The rest of the perimeter regions remain inactive in this mode.

FIG. 9 shows the heads-up display in pointing device mode, where the collection of the center regions acts as a regular touch pad. The contact point 50E on the touch pad is displayed in a darker shade. The usual actions such as tapping, moving and dragging as it is on a typical touch pad are transmitted to the operating system for appropriate processing as required.

FIG. 10 and FIG. 11 show the heads-up display in symbol mode, where the collection of center regions acts as a trace pad for drafting symbols. The adjacent regions 50A, 50B and 50C, where the contact point moves across with a tracing motion are marked as line segments, and the region 50H where the contact point briefly rests or tapped once, depending on how the system is configured, is marked as a dot. Repeating the same actions on the marked regions erases the markings. If a significant pause where no contact is detected, the system assumes that the user has completed drawing the symbol and tries to match it with the patterns stored in its memory. The system can be configured to recognize alphanumeric characters from Standard English or other languages, and can also be trained to recognize custom symbols. FIG. 10 shows the letter "T" and FIG. 11 shows the "!" mark, drawn on the collection of center regions.

Alphanumeric mode can be simultaneously active with pointing device mode and symbol mode, but it cannot be simultaneously active with standard 12-key telephone keypad mode, since the lower three regions 40E, 40F and 40G as shown in FIG. 8 are used to represent the characters "#," "0" and "*" respectively in this mode, unless alternative arrangements have been made.

FIG. 12 shows the virtual keypad system on a corded (cord not shown) desktop telephone unit.

FIG. 13 shows the virtual keypad system on a mobile telephone unit. Due to the limited space available, the heads-up display 4 is positioned on the display and the character labels 5 are positioned inside the perimeter regions. One possible configuration is to have the heads-up display show up only when the user touches the keypad. It would also be possible to dim the material currently displayed to give the heads-up display greater visibility. Another possibility is to use a touch-screen, which is not only pressure sensitive like a touch pad, but also capable of displaying information, and display the state of the keypad on the touch-screen itself.

DESCRIPTION AND OPERATIONS

Alternative Embodiments

A number of alternative embodiments are illustrated to demonstrate potential improvements for ergonomics or aesthetics.

FIG. 14 shows an alternative embodiment with ridges 70 around the regions for improved tactile feedback.

When the user moves her contact point across the touch pad surface, the ridges give a tactile feed back of the movement across the regions.

FIG. 15 shows another alternative embodiment with recessed center regions and downward sloping perimeter regions 72 for improved tactile feedback.

When the user moves the contact point across the touch pad surface, the angular edge where the sloping surface of the perimeter regions and the flat center regions meet, gives a tactile feed back of which set of regions the contact point is positioned in.

FIG. 16 shows another alternative embodiment with dimpled regions 74 for improved tactile feedback.

When the user moves the contact point across the touch pad surface, the dimples snuggly lodge the contact point on the touch pad surface and gives the user extra assurance that the contact point is inside a region.

FIG. 17 shows another alternative embodiment with raised regions 76 for improved tactile feedback.

When the user moves her contact point across the touch pad surface, sensation of ascending the raised side of a region and reaching the crown of the raised surface gives the user extra assurance that the contact point is inside and in the center of a region.

FIG. 18 shows another alternative embodiment with a circular perimeter region 78 for improved appearance. A circular groove (not shown) can be implemented in the area of the perimeter regions for improved tracking when making a swiping motion.

When the user makes a swiping motion on the perimeter regions, the groove helps the contact point to remain in the perimeter regions.

FIG. 19 shows another alternative embodiment with asymmetric perimeter regions 80 to aid one-handed operations.

In one-handed operations, the user would most likely hold the device with one hand with the scale-downed side of the regions located next to the base of her thumb, and operate the device with her thumb. In this case, the scaled down regions would better accommodate the more restrictive movement of the thumb when it is folded closer to its base or the palm.

FIG. 20 shows another alternative embodiment where a subset of regions 82, regions in the positions of numerals 1, 2, 3, 4, 6, 7, 8 and 9 in a standard 12-key telephone keypad layout, serve as common regions.

In alphanumeric mode, when the contact point moves across the regions designated to double as perimeter regions, the character assignment to each region is changed in a fashion similar to the operation of the device with a layout with separate perimeter and center regions.

FIG. 21 shows another alternative embodiment where push button keys 86 are covered by a flexible pressure sensitive touch pad 84.

The push button keys capture the distinct downward pressure, and the pressure sensitive surface captures the movement of the contact point across regions, offering the capability of fast character input while retaining the familiar tactile sense of the push button keys to the device.

CONCLUSION, RAMIFICATIONS AND SCOPE OF INVENTION

The reader will see that the present invention provides a means to enter text with speed and ease, and at the same time is intuitive and compact. It also effectively quadruples as an alphanumeric input device, a standard 12-key telephone keypad, a regular touch pad, and a symbol input device.

While the above description contains many specifications, these should not be construed as a limitation of the scope of the invention, but rather as an exemplification of a few embodiments thereof.

Many other variations are possible. For example, other embodiments with more or less regions, different character sets or label sets, various symbol libraries, a combination of features from different embodiments, a combination of surface textures and shapes, and arrangements where the center and perimeter regions are designed to work in coordination. Variants of the present design can also be implemented with push button keys, or a combination of a pressure sensitive touch pad and push button keys.

In addition, touch sensitive mediums implemented by optical, thermal, chemical, or organic means, in addition to the type of mediums implemented by tactual means, could also be employed.

Accordingly, the scope of the invention should be determined not by the embodiments illustrated, but by the appended claims and their legal equivalents.

What is claimed is:

1. An input device comprising:
   a) a first region defined in a first spatial medium, a medium that can exist in three dimensional space, and a second region defined in a second spatial medium, wherein the angular relationship between the operating surfaces of said first and second regions is less than 360 degrees;
   b) a processor, a collection of software and hardware subsystems, in communication with said first and second spatial mediums; and
   c) one or more instructions defined within said processor configured to interpret the state of an object,
   wherein said second region indicates the attribute represented by said first region only on detection of said object resting in said first region.

2. An input device of claim 1 wherein:
   a) said first region and second regions are different;

b) said first and second spatial mediums are connected by a solid mass assembly;
c) said indication is visual;
d) centroids of said visual indication and said object is at an offset; and
e) said second region indicates only the attribute of said first region.

3. An input device of claim 2 wherein said object is resting in said first region as a result of traversing a designated boundary.

4. An input device of claim 2 wherein said object is resting in said first region as a result of engaging with said touchpad.

5. An input device of claim 4 wherein a function associated with said attribute represented by said first region is invoked on disengagement of said object with said touchpad.

6. Said input device in claim 2 wherein said touchpad senses the state of said object by tactile sensing.

7. Said input device in claim 2 wherein said touchpad senses the state of said object by motion sensing.

8. Said input device in claim 2 wherein said touchpad senses the state of said object by optical, thermal, chemical or organic sensing.

9. A non-transitory computer readable medium encoded with computer readable instructions for an input device wherein said instructions comprise:
a) defining a first region and a second region on a touch-screen;
b) interpreting the signals generated by interaction with said touch-screen; and
c) indicating an attribute represented by a region on said touch-screen;
wherein the semantic equivalent of the attribute represented by said first region is indicated in said second region on detection of an object resting in said first region.

10. A non-transitory computer readable medium encoded with computer readable instructions for an input device in claim 9 wherein said object is resting in said first region as a result of traversing a designated boundary.

11. A non-transitory computer readable medium encoded with computer readable instructions for an input device in claim 9 wherein said object is resting in said first region as a result of engaging with said touch-screen, and a function associated with said attribute represented by said first region is invoked on disengagement of said object with said touch-screen.

12. A non-transitory computer readable medium encoded with computer readable instructions for an input device in claim 9 wherein said touch-screen senses said interaction by tactile or motion sensing.

13. An input device comprising:
a) a first region and a second region defined on a touch-screen;
b) the touch-screen generating signals in response to interaction with the touch-screen; and
c) a processor, a collection of software and hardware sub-systems with one or more of instructions defined, in communication with said touch-screen to interpret the signals generated by interaction with the touch-screen,
wherein said processor on detection of an object resting in said first region indicates the attribute represented by said first region in said second region as a heads-up.

14. An input device of claim 13 wherein:
a) said first and second regions are different;
b) said second region indicates the semantic equivalent of the attribute represented by said first region;
c) said indication is visual;
d) centroids of said visual indication and said object is at an offset; and
e) said second region indicates the attribute of said first region only on detection of an object resting in said first region.

15. A input device in claim 14 wherein said object is resting in said first region as a result of traversing a designated boundary.

16. A input device in claim 14 wherein said object is resting in said first region as a result of engaging with said touch-screen.

17. A input device in claim 16 wherein a function associated with said attribute represented by said first region is invoked on disengagement of said object with said touch-screen.

18. An input device of claim 14 wherein said touch-screen senses said interaction by tactile sensing.

19. An input device of claim 14 wherein said touch-screen senses said interaction by motion sensing.

20. An input device of claim 14 wherein said touch-screen senses said interaction by optical, thermal, chemical or organic sensing.

* * * * *